United States Patent
Machielse et al.

(10) Patent No.: US 12,265,254 B1
(45) Date of Patent: Apr. 1, 2025

(54) SELF-ALIGNED FABRICATION PROCESS FOR COUPLING OF PHOTONIC WAVEGUIDES

(71) Applicant: LIGHTSYNQ TECHNOLOGIES INC., Cambridge, MA (US)

(72) Inventors: Bartholomeus Johannes Machielse, Somerville, MA (US); Denis Sukachev, Brookline, MA (US); Beibei Zeng, Medford, MA (US); Mihir Keshav Bhaskar, Cambridge, MA (US); David Sarkis Levonian, Cambridge, MA (US)

(73) Assignee: LIGHTSYNQ TECHNOLOGIES INC., Cambridge, MA (US)

( * ) Notice: Subject to any disclaimer, the term of this patent is extended or adjusted under 35 U.S.C. 154(b) by 239 days.

(21) Appl. No.: 17/936,782

(22) Filed: Sep. 29, 2022

(51) Int. Cl.
| | |
|---|---|
| *G02B 6/122* | (2006.01) |
| *G02B 6/30* | (2006.01) |
| *G06N 10/40* | (2022.01) |
| G02B 6/12 | (2006.01) |
| G02B 6/132 | (2006.01) |
| G02B 6/136 | (2006.01) |

(52) U.S. Cl.
CPC .......... *G02B 6/1228* (2013.01); *G02B 6/305* (2013.01); *G06N 10/40* (2022.01); *G02B 2006/1204* (2013.01); *G02B 2006/12061* (2013.01); *G02B 2006/12176* (2013.01); *G02B 6/132* (2013.01); *G02B 6/136* (2013.01)

(58) Field of Classification Search
None
See application file for complete search history.

(56) References Cited

U.S. PATENT DOCUMENTS

| | | | | |
|---|---|---|---|---|
| 7,079,727 | B1* | 7/2006 | Little | G02B 6/132 |
| | | | | 385/28 |
| 7,095,920 | B1* | 8/2006 | Little | G02B 6/12002 |
| | | | | 385/14 |
| 7,303,339 | B2 | 12/2007 | Zhou | |
| 7,583,869 | B2* | 9/2009 | Kang | H01S 5/026 |
| | | | | 385/129 |
| 9,229,293 | B2* | 1/2016 | Kono | G02F 1/025 |
| 9,261,649 | B2* | 2/2016 | Kitamura | G02B 6/136 |
| 9,715,070 | B2 | 7/2017 | Sandhu | |
| 10,168,497 | B2 | 1/2019 | Merget | |

(Continued)

*Primary Examiner* — Jerry Rahll
(74) *Attorney, Agent, or Firm* — Dickinson Wright PLLC

(57) ABSTRACT

A self-aligned fabrication process for aligning photonic waveguide layers of a 3D photonic structure such that light may be efficiently transferred between the two layers is described. The self-aligned fabrication process comprises using a mask to pattern both photonic waveguide layers, such that they are aligned three-dimensionally via a single lithographic processing step, and thus fabricating a photonically coupled region of the 3D photonic structure. Selective etching may also be used to taper a given photonic waveguide layer for adiabatic coupling, and/or to produce other non-trivial geometric shapes in the photonic waveguide layers. Such 3D photonic structures may be fabricated for use in quantum memory devices, in which one of the photonic waveguide layers may host quantum memories and another photonic waveguide layer may interface with an optical fiber, such that light may be transferred between an optical fiber and respective ones of the quantum memories.

20 Claims, 9 Drawing Sheets

(56) References Cited

U.S. PATENT DOCUMENTS

| | | |
|---|---|---|
| 11,085,998 B2 | 8/2021 | Sayyah |
| 11,853,847 B2 * | 12/2023 | Choi ................... G06N 10/40 |
| 2004/0120648 A1 * | 6/2004 | Kwon ................. G02B 6/1228 385/43 |
| 2006/0285797 A1 * | 12/2006 | Little .................. G02B 6/1228 385/28 |
| 2009/0324163 A1 * | 12/2009 | Dougherty ........... G02B 6/1228 385/14 |
| 2015/0316723 A1 * | 11/2015 | Taylor ................. G02B 6/1228 385/2 |
| 2016/0131837 A1 * | 5/2016 | Mahgerefteh .......... G02B 6/124 385/14 |
| 2022/0146749 A1 | 5/2022 | Bandyopadhyay et al. |
| 2022/0269974 A1 * | 8/2022 | Bhaskar ................. G02F 3/024 |

* cited by examiner

SELF-ALIGNED FABRICATION PROCESS FOR COUPLING OF PHOTONIC WAVEGUIDES

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the sum of squared absolute values of the complex numbers (e.g., $|x|^2+|y|^2$) must sum to one. Each of the two complex numbers (e.g., x and y) is called an amplitude, and their respective quasi-probabilities are the squared absolute values of the complex numbers (e.g., $|x|^2$ and $|y|^2$, respectively). Hence, the square of the absolute value of each complex number corresponds to the probability of event zero or event one happening. A fundamental and counter-intuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

There are different types of qubits that may be used in quantum computers, each having different advantages and disadvantages. For example, some quantum computers may include qubits built from superconductors, trapped ions, semiconductors, photons, etc. Each may experience different levels of interference, errors and decoherence. Also, some may be more useful for generating particular types of quantum circuits or quantum algorithms, while others may be more useful for generating other types of quantum circuits or quantum algorithms.

Figure 1A:
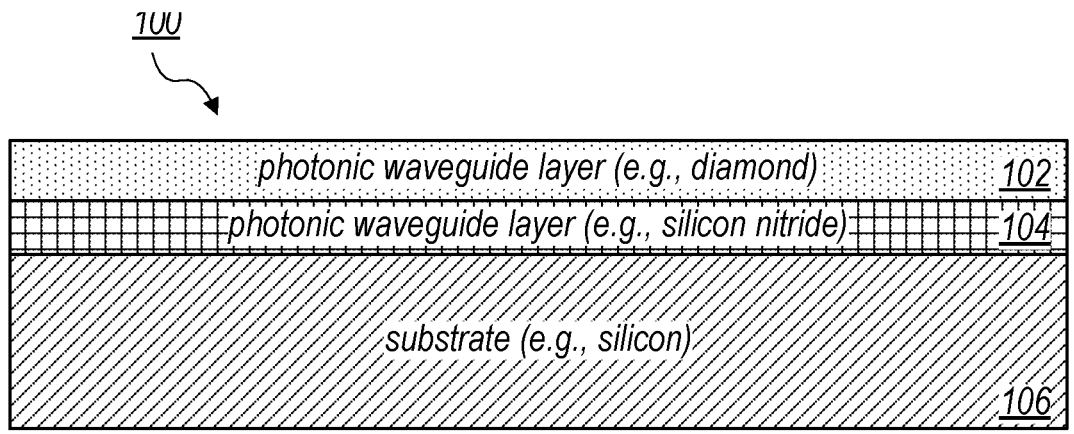
FIG. 1A illustrates two photonic waveguide layers on top of a substrate that are used to form a 3D photonic structure via a self-aligned fabrication process, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for self-aligning photonic waveguide layers of a 3D photonic structure, via a self-aligned fabrication process, for efficient transfer of light (e.g., photons) between said layers. Finding materials that exhibit and fulfill all needs of a given photonic platform may be challenging, and may possibly be made further difficult if a given photonic material is not easily and efficiently deposited, bonded, etc. to one or more other photonic materials via standard device fabrication methods. For example, some photonic materials may have good optical properties in some domains of photonics, while not in other domains. In another example, some photonic materials may have the potential to be good hosts for quantum emitters and/or quantum memories, but some of such photonic materials may not also have good electrooptic properties, and/or may be difficult to easily pattern using standard fabrication techniques. As such, there is a need for the ability to transfer light between a photonic material that may be used as a host for quantum memories and another photonic material that exhibits conventional optical properties without suffering high losses in the process (e.g., due to a lack of finely tuned alignment, on the order of nanometers, between the two materials). High losses may be incurred if there is a misalignment between the photonically coupled region of the two materials, making it difficult to robustly fabricate 3D photonic structures that efficiently transport light between two photonic materials with nanometer-level accuracy.

In some embodiments, accurate 3D alignment (e.g., nanometer-scale alignment) of multiple photonic materials may be ensured via self-aligned fabrication processes, such as those described herein, and without the need for finely tuned alignment procedures (e.g., using standard fabrication techniques that allow for micrometer-scale alignment). By using a same mask to pattern both photonic materials during a single lithographic processing step, the photonic materials may be, by the effect of said patterning, three-dimensionally aligned (e.g., superimposed onto a substrate, as shown in FIG. 1C), allowing for the transfer of light between the multiple photonic materials to occur with high efficiency, and without the need for complex and/or challenging fabrication processes (e.g., processes that would require higher precision than a micrometer-level accuracy). Such self-aligned processes may be advantageous for use in many photonic platforms, such as in quantum memory devices, which may be used to receive and store photons.

This written description continues with a general description of embodiments and implementations of self-aligned 3D photonic structures, followed by methods for incorporating such self-aligned 3D photonic structures into quantum memory devices. Finally, a description of an example computing system upon which the various components, modules, systems, and/or devices may be implemented is provided. Various examples are provided throughout the specification. A person having ordinary skill in the art should also understand that the previous and following description of self-aligned 3D photonic structures is not to be construed as limiting as to the implementation of said structures, or portions thereof.

FIG. 1A illustrates two photonic waveguide layers on top of a substrate that are used to form a 3D photonic structure via a self-aligned fabrication process, according to some embodiments.

In some embodiments, a 3D photonic structure stack that may be used to fabricate a 3D photonic structure (e.g., such as those shown in at least FIGS. 1G and 1H) may resemble 3D photonic structure stack 100. Photonic waveguide layer 104 may be deposited, grown, bonded, or otherwise attached to substrate 106, and photonic waveguide layer 106 may also be bonded to photonic waveguide layer 104. In some embodiments, 3D photonic structure stack 100 may be considered to be a substrate with multiple layers (e.g., substrate 106 and photonic waveguide layer 104) that has a thin film (photonic waveguide layer 102) deposited onto it.

Photonic waveguide layer 104 may be a material that may be patterned such that optical waveguides may be formed into the material (e.g., silicon nitride, lithium niobate, aluminum nitride, etc.). It may be additionally optically transparent within one or more given wavelength ranges (e.g., a visible light spectrum), and may also have nonlinear optical and/or electrooptical properties. Photonic waveguide layer 102 may be a material that may be configured to be deposited as a thin film (e.g., a layer between approximately 50 nm and 2 µm thick), and may be configured to host optically active quantum memories (e.g., photonic waveguide layer 308). Substrate 106 may be a material (e.g., silicon, silicon dioxide, another material with a low index of refraction, etc.) that can be removed from underneath photonic waveguide layer 104 without interfering optical properties of photonic waveguide layer 104 or photonic waveguide layer 102.

In some embodiments, various bonding techniques may be used to bond photonic waveguide layer 102 and photonic waveguide layer 104 to one another, based, at least in part, on the chosen materials for the respective layers. For example, van der Waals bonding, eutectic bonding, and/or adhesive bonding may be used to bond photonic waveguide layer 102 and photonic waveguide layer 104 to one another. In some embodiments in which eutectic bonding is used, a metal layer (e.g., gold, tin, indium, etc.) may be deposited in between photonic waveguide layer 102 and photonic waveguide layer 104, and the metal layer may subsequently be selectively removed (e.g., via chemical etching) from optically active portions of a 3D photonic structure during fabrication. In some embodiments in which adhesive bonding is used, a polymer layer (e.g., photoresist, E-beam resist, etc.) may be deposited in between photonic waveguide layer 102 and photonic waveguide layer 104, and the polymer layer may subsequently be selectively removed (e.g., via chemical etching) from optically active portions of a 3D photonic structure during fabrication.

In such embodiments in which a metal layer or a polymer layer is deposited in between photonic waveguide layer 102 and photonic waveguide layer 104, the metal layer or polymer layer may be referred to as a "spacer" layer. Additional examples of a spacer layer in between photonic waveguide layer 102 and photonic waveguide layer 104 may include a plastic material, a low-loss dielectric material (e.g., silicon oxide, silicon nitride, etc.), or any material that causes photonic waveguide layer 102 and photonic waveguide layer 104 to be vertically separated by a fixed distance. For ease of discussion herein, the spacer layer may be referred to as one of the layers of photonic waveguide layer 104 (e.g., wherein photonic waveguide layer 104 has a silicon nitride layer and a spacer layer).

A spacer layer may be used in some embodiments in which two photonic waveguide layers of a 3D photonic structure are photonically coupled via evanescent coupling. Evanescent coupling may be defined as light being transported and/or transferred between two photonic waveguide layers (e.g., photonic waveguide layer 102 and photonic waveguide layer 104) while the two photonic waveguide layers are within a fixed distance of one another (but not vertically in contact with one another), allowing light to jump back and forth between the two photonic waveguide layers. An example of evanescent coupling is described herein with regard to waveguide/optical fiber interface 318 in FIG. 3.

Figure 1B:
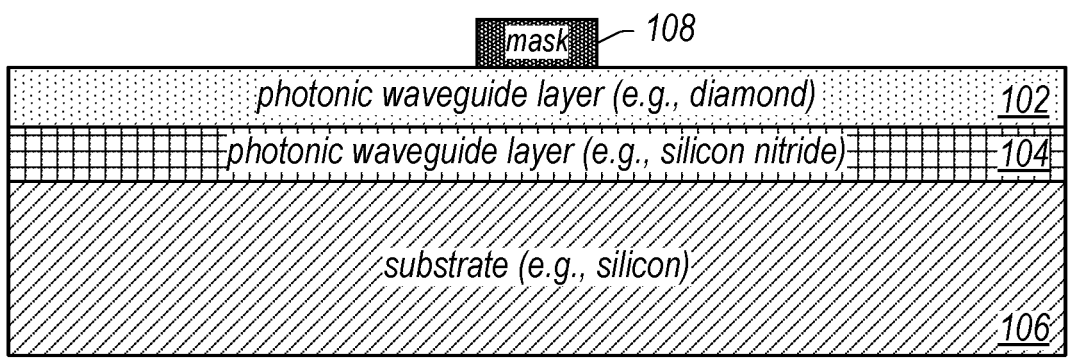
FIG. 1B illustrates the deposition of a mask on top of the second photonic waveguide layer in preparation for removing portions of the first and second photonic waveguide layers via a single masking pattern, according to some embodiments.
Figure 1C:
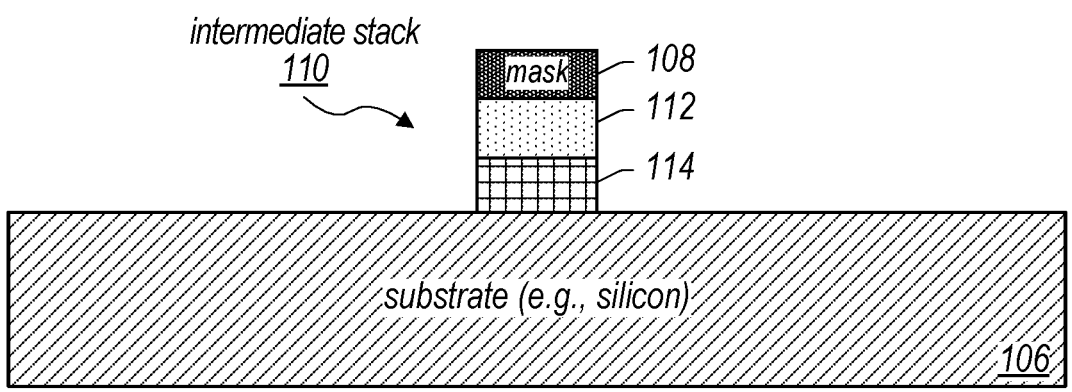
FIG. 1C illustrates the result of removing unmasked portions of the first and second photonic waveguide layers, according to some embodiments.

FIG. 1B illustrates the deposition of a mask on top of the second photonic waveguide layer in preparation for removing portions of the first and second photonic waveguide layers via a single masking pattern, and FIG. 1C illustrates the result of removing unmasked portions of the first and second photonic waveguide layers, according to some embodiments.

In some embodiments, FIGS. 1B and 1C may resemble a moment just before and just after a chemical etching process step. Mask 108 may be deposited onto photonic waveguide layer 102, as shown in FIG. 1B, such that portions of photonic waveguide layer 102 and photonic waveguide layer 104 that are vertically underneath mask 108 may remain unremoved during the one or more etching process steps. The chemical etching step(s) are then performed such that portions of photonic waveguide layer 102 and photonic waveguide layer 104 are removed, resulting in intermediate stack 110, as shown in FIG. 1C.

A person having ordinary skill in the art should understand that mask 108 may result from a single lithographic processing step, in which photoresist is spun onto 3D photonic structure stack 100 such that 3D photonic structure stack 100 has a coating of photoresist, then 3D photonic structure stack 100 is exposed to UV light such that photosensitive properties of the photoresist are altered according to a mask pattern. Next, a developing solution may be used, resulting in some portions of the original photoresist coating to be removed and some portions of the original photoresist coating to remain (e.g., mask 108), according to a type of positive or negative photoresist used during the lithography processing step. In some embodiments described herein, masking and/or other fabrication-related process steps may refer to various types of photolithography, Electron-beam (E-beam) lithography, etc., and such terms should not be misconstrued as limiting in the discussion herein. In some embodiments in which E-beam lithography is used, at least in part, to produce a 3D photonic structure, such as those described herein, program instructions may be executed using computing device 600 to pattern 3D photonic structure stack 100, and E-beam resist may be used to generate mask 108, etc. Furthermore, in some embodiments in which an E-beam lithography technique is used, mask 108 may be composed of a metal-HSQ stack, in which both an underlying metal (titanium, niobium, chromium, etc.) and hydrogen silsesquioxane (HSQ) layers may be included in the mask. In other embodiments in which an E-beam lithography technique is used, mask 108 may be composed of an oxide-polymer or nitride-polymer stack, in which both an oxide (e.g., silicon oxide, aluminum oxide, titanium oxide, etc.) or nitride (e.g., silicon nitride, aluminum nitride, etc.) layer and a polymer (e.g., polymethyl methacrylate (PMMA), Zeon E-beam Positive-tone resist (ZEP), etc.) layer may be included in the mask.

A person having ordinary skill in the art should also understand that various embodiments that result in a fabrication of intermediate stack 110, via a use of a single masking pattern, may be used to achieve intermediate stack 110. For example, various combinations of one or more etching process steps may be used to etch one or both portions of photonic waveguide layer 102 and photonic waveguide layer 104 depending on whether or not mask 108 is composed of two layers (e.g., a polymer and a hard mask, a polymer and an oxide-based photoresist, etc.) that may facilitate etching through two materials (photonic waveguide layer 102 and photonic waveguide layer 104) during the same processing step. Alternatively, a first chemical etching step and a subsequent chemical etching step may be used to respectively etch through portions of photonic waveguide layer 102 and photonic waveguide layer 104. In embodiments in which two or more chemical etching steps are used to obtain intermediate stack 110, multiple etching procedures may be used to incrementally etch through said materials within a same larger patterning processing step. Furthermore, wet etching (e.g., chemical etching) and/or dry etching (e.g., plasma/gas etching) procedures may be used to obtain intermediate stack 110, and the discussion herein should not be misconstrued as limiting in terms of the types of fabrication techniques used to obtain intermediate stack 110, nor any 3D photonic structure described herein. Various other embodiments may also be used that may result in intermediate stack 110 through a use of a single masking pattern such as mask 108.

Figure 1D:
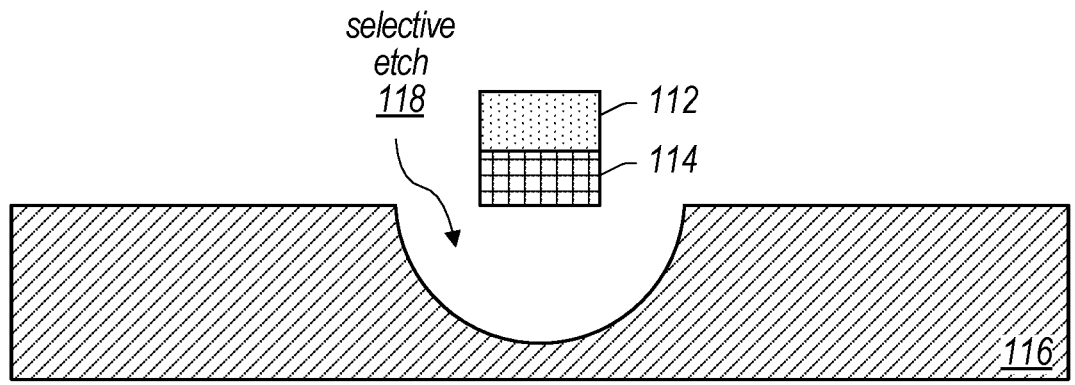
FIG. 1D illustrates selectively etching a portion of the substrate underneath the first and second photonic waveguide layers in order to isolate said layers from the substrate, according to some embodiments.

FIG. 1D illustrates selectively etching a portion of the substrate underneath the first and second photonic waveguide layers in order to isolate said layers from the substrate, according to some embodiments.

As shown in FIG. 1D, selective etch 118 may be performed (e.g., using one or more of the etching techniques described above with regard to FIGS. 1A-1C) such that portions of substrate 116 may be removed from underneath photonic waveguide layers 112 and 114. Selective etch 118 may be "selective" as it etches one or more materials (e.g., substrate 116) but not one or more other materials (e.g., photonic waveguide layers 112 and 114), according to some embodiments. For example, in some embodiments in which substrate 116 is silicon, photonic waveguide layer 114 is silicon nitride, and photonic waveguide layer 112 is diamond, selective etch 118 may comprise chemicals such as KOH or $XeF_2$, which may etch silicon but not silicon nitride or diamond, according to some embodiments.

In some embodiments, it may be advantageous to isolate photonic waveguide layers 112 and 114 from substrate 116 in order to further optimize photonic coupling within the 3D photonic structures described herein and avoid possible optical interference. A person having ordinary skill in the art should understand that photonic waveguide layers 112 and 114 are locally suspended and/or isolated from substrate 116 in the portion of 3D photonic structure stack 100 shown in FIG. 1D, and are cantilevered or otherwise attached to substrate 116 in at least one other portion of 3D photonic structure stack 100. For examples of such attachments, see the discussion regarding photonically coupled region 310 and waveguide/optical fiber interface 318 herein.

Figure 1E:
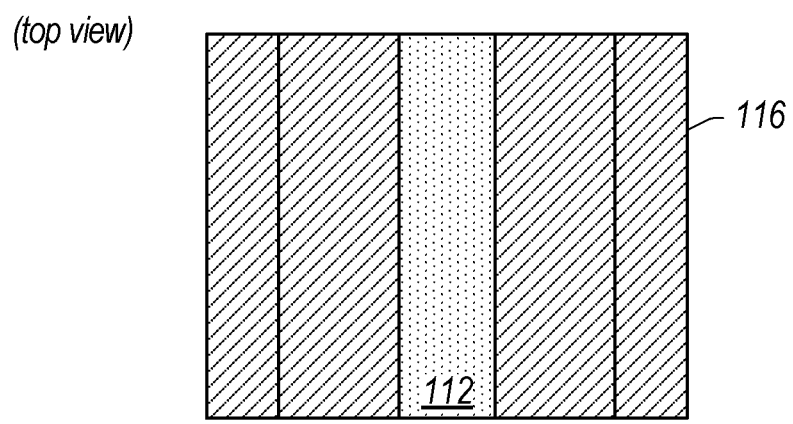
FIG. 1E illustrates a top view of the formation of the 3D photonic structure at the moment also depicted in FIG. 1D, according to some embodiments.

FIG. 1E illustrates a top view of the formation of the 3D photonic structure at the moment also depicted in FIG. 1D, according to some embodiments.

Figure 1F:
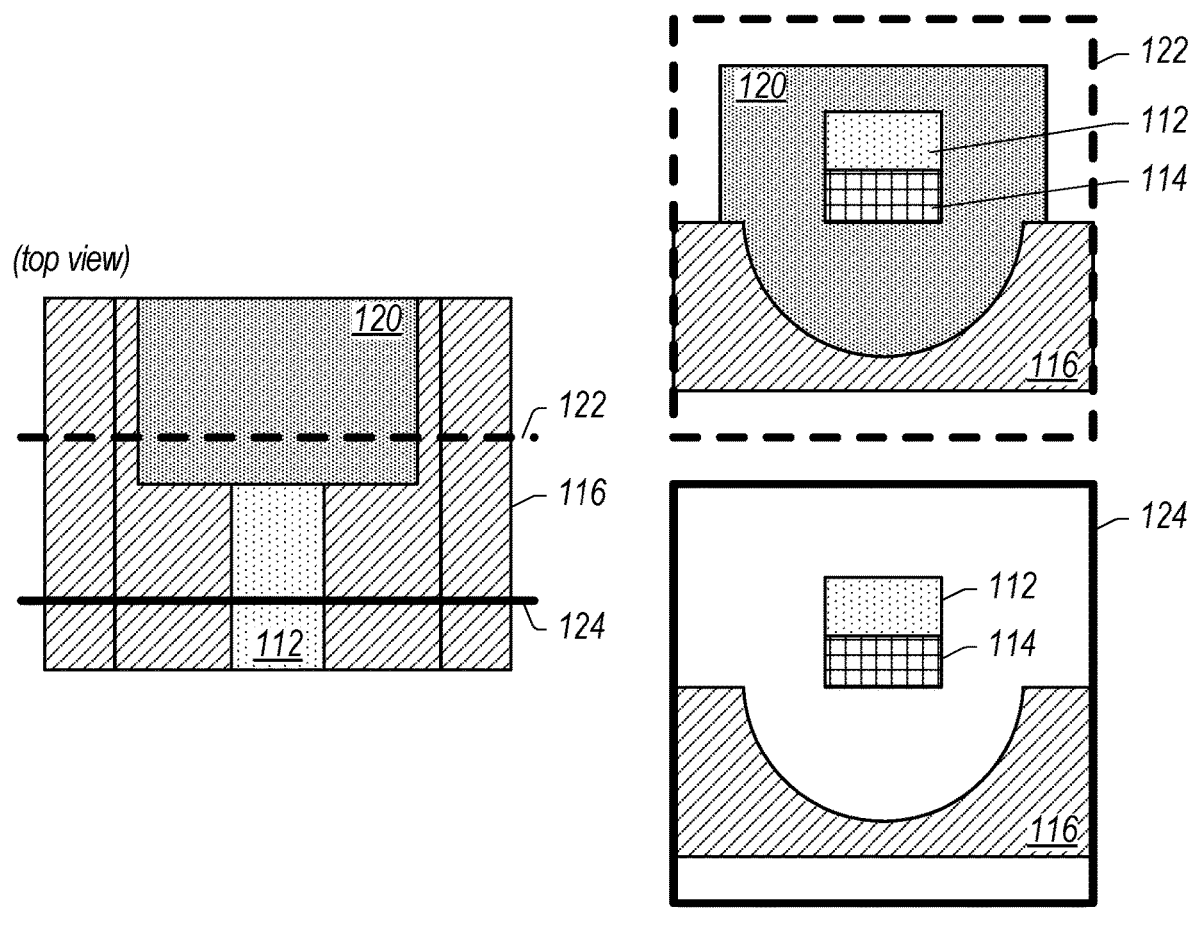
FIG. 1F illustrates the addition of a mask onto a portion of the 3D photonic structure, according to some embodiments.
Figure 1G:
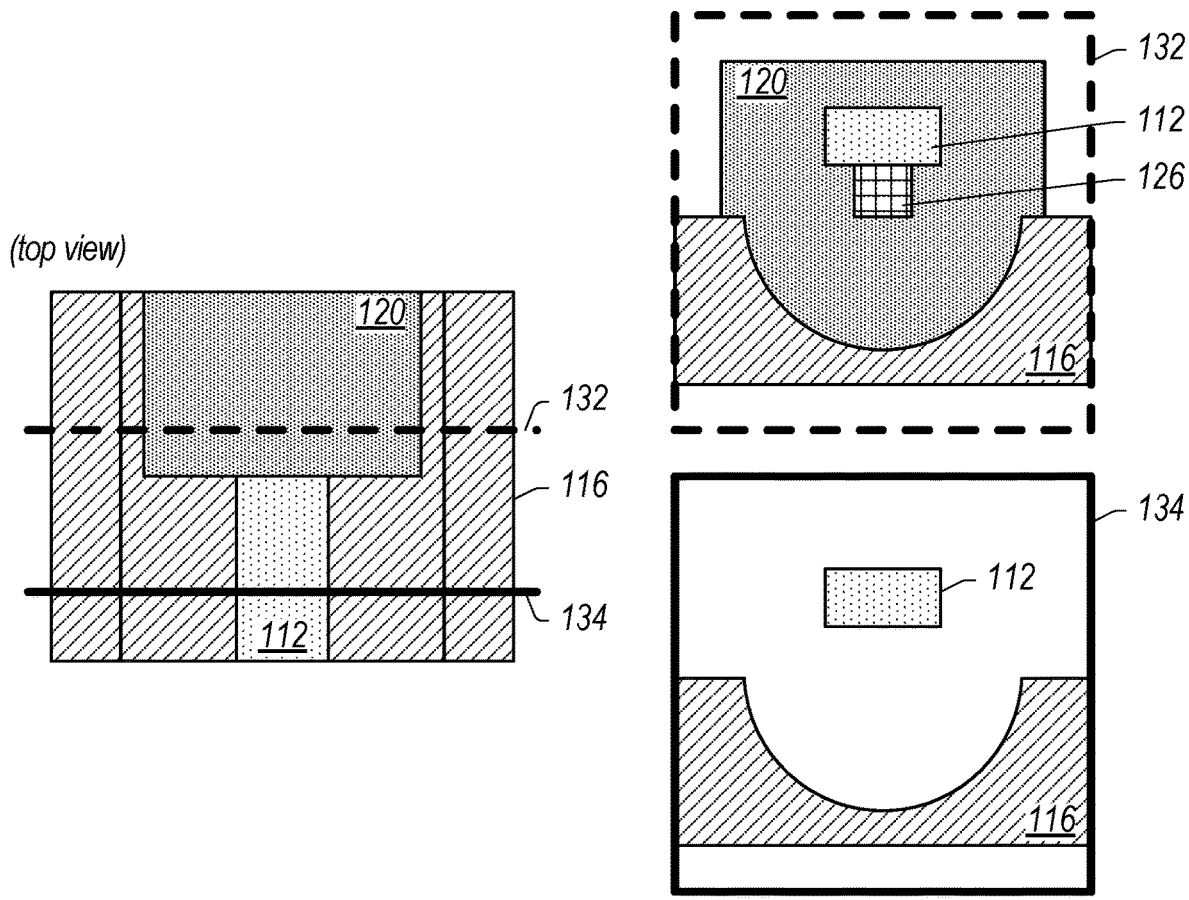
FIG. 1G illustrates the result of removing unmasked portions of the first photonic waveguide layer, according to some embodiments.
Figure 1H:
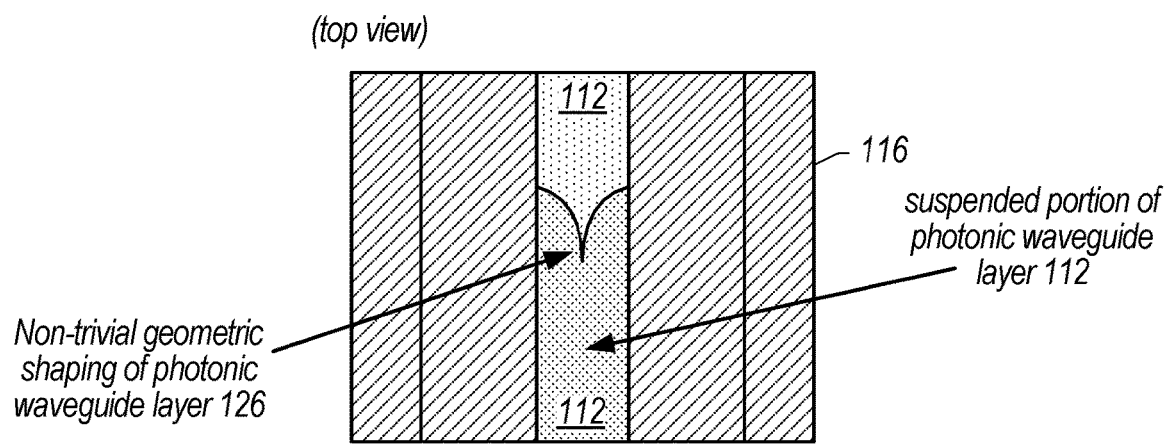
FIG. 1H illustrates an example of a non-trivial geometric shape (e.g., tapering of the second photonic waveguide layer) that may be obtained using self-aligned fabrication processes, such as those described herein, according to some embodiments.
Figure 3:
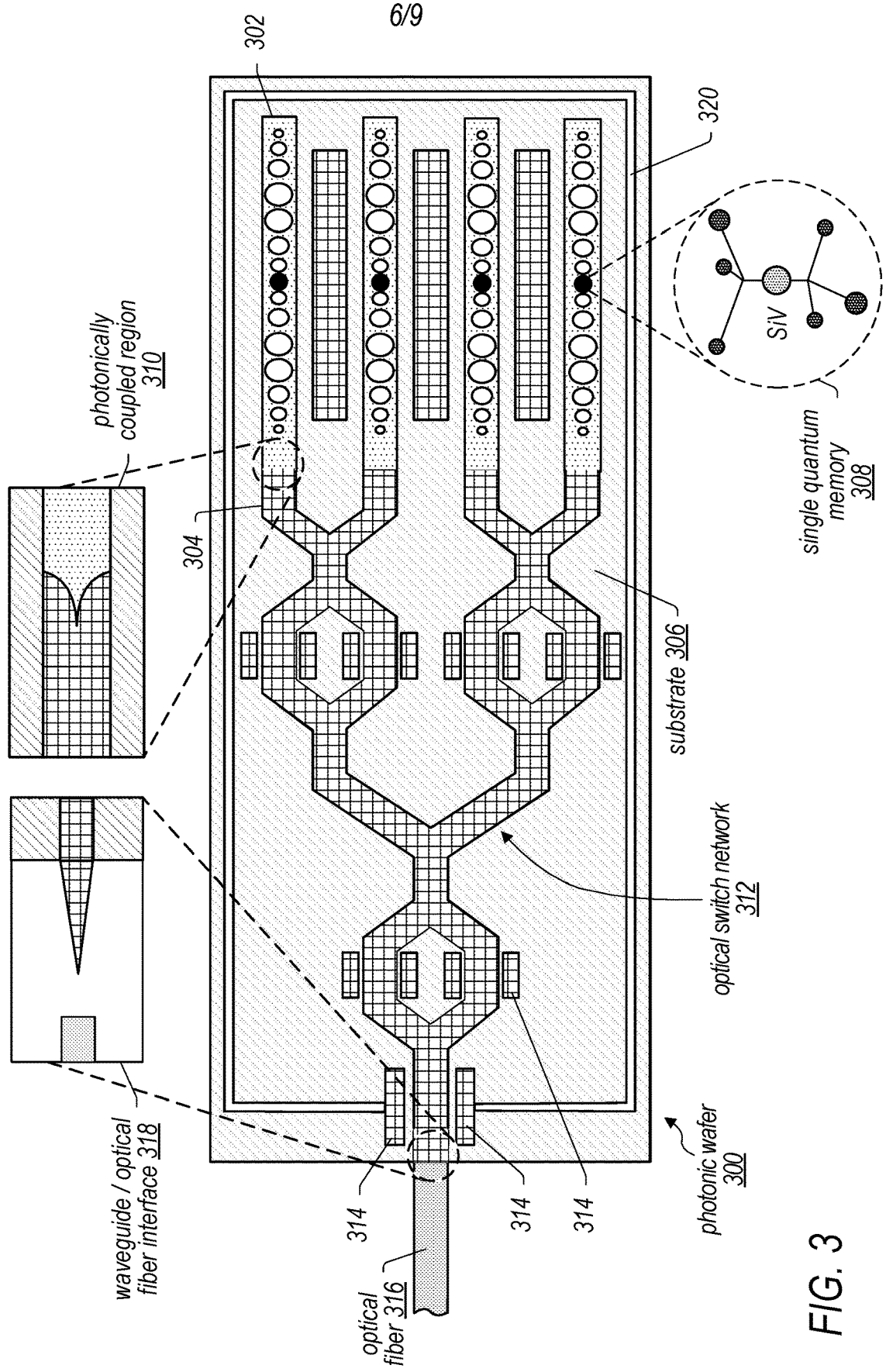
FIG. 3 illustrates an example implementation of a photonic wafer, formed, at least in part, by a self-aligned fabrication process, in which light may be transported between the first and second photonic waveguide layers via photonically coupled waveguide regions of the photonic wafer, according to some embodiments.

As shown in FIG. 1E, photonic waveguide layer 112 and photonic waveguide layer 114 are bonded together and locally isolated from substrate 116. In some embodiments, FIGS. 1D and 1E may be viewed as a "starting point" for various components of a given 3D photonic structure that may be fabricated for the various applications of the 3D photonic structure. For example, in some embodiments in which 3D photonic structure stack 110 may be used to fabricate portions of photonic wafer 300, it may be advantageous to fabricate a portion of photonic waveguide layer 114 that is locally isolated from substrate 116 and also locally isolated from photonic waveguide layer 112. By locally isolating (and optionally tapering) the portion of photonic waveguide layer 114, said portion of photonic waveguide layer 114 may then be photonically coupled (e.g., via adiabatic or evanescent coupling) to an optical fiber, as shown in waveguide/optical fiber interface 318. Other combinations of locally isolated portions of either photonic waveguide layer 114 and/or photonic waveguide layer 112 may be fabricated based, at least in part, on the intended application of a given 3D photonic structure (see also photonically coupled region 310, as shown in FIG. 3). FIGS. 1F-1H continue with demonstrating an example generating a tapered waveguide layer using photonic waveguide layer 112. A person having ordinary skill in the art should understand that procedures such as those shown in FIGS. 1F-1H may similarly be applied for generating a tapered waveguide layer using photonic waveguide layer 114. Furthermore, in some embodiments in which a given 3D photonic structure has evanescent coupling regions, tapering of a given photonic waveguide layer, such as that which is shown in FIG. 1H, may or may not be used.

FIG. 1F illustrates the addition of a mask onto a portion of the 3D photonic structure, and FIG. 1G illustrates the result of removing unmasked portions of the first photonic waveguide layer, according to some embodiments.

As shown in FIG. 1F, a portions of photonic waveguide layers 112 and 114 and substrate 116 are covered in mask 120. Dashed line 122 and solid line 124 depict side-view slices of embodiments shown in FIG. 1F, demonstrating how mask 120 covers photonic waveguide layers 112 and 114 and substrate 116 at dashed line 122, but not at solid line 124. Mask 120 may be composed of resist that has been patterned via one or more of the lithography techniques described with regard to FIGS. 1A-1D herein. As described above with regard to FIGS. 1B-1C, FIGS. 1F-1G may resemble a moment just before and just after a chemical etching process step. In some embodiments such as in FIGS. 1F-1G, the chemical etching solution may selectively etch the material chosen for photonic waveguide layer 114, such that, tracing from dashed line 132 to solid line 134 with regard to FIG. 1G, more and more of photonic waveguide layer 126 has been etched. Following the chemical etching process step shown in FIGS. 1F-1G, mask 120 is removed (as seen in FIG. 1H, for example). Furthermore, the use of mask 120 may be viewed as a mechanism for fabricating a photonically coupled region with a low level of required alignment. For example, remaining portions of photonic waveguide layer 112 and photonic waveguide layer 126 (e.g., a photonically coupled region) have been "self-aligned" with nanometer-level accuracy via the methods and processes described herein while only requiring approximately a micron-level alignment accuracy during fabrication of the photonically coupled region.

FIG. 1H illustrates an example of a non-trivial geometric shape (e.g., tapering of the second photonic waveguide layer) that may be obtained using self-aligned fabrication processes, such as those described herein, according to some embodiments.

In some embodiments, a selective etching step, such as the chemical etching process step shown in FIGS. 1F-1G, may be used to fabricate non-trivial geometries, such as the tapering of photonic waveguide layer 126 as shown in FIG. 1H. As discussed above with regard to FIG. 1G, photonic waveguide layer 112 may be transparent within a visible light spectrum such that a tapering of photonic waveguide layer 126 may be seen via a top view, as shown in FIG. 1H. In some embodiments, a length of the tapered region of photonic waveguide layer 126 may be proportionate to the width of the corresponding photonic waveguide layer, and therefore by customizing such dimensions and/or parameters of the photonic waveguide layers of intermediate stack 110, a mode conversion structure (e.g., a conversion interface that may convert a transmission frequency of a given photon, received to the 3D photonic structure via an optical fiber, to a different frequency) may be formed that allows the tapered region to extend into the adiabatic transfer regime.

In some embodiments, the photonically coupled region between photonic waveguide layer 112 and photonic waveguide layer 126 shown in FIG. 1H may be used to adiabatically couple said photonic waveguide layers. Adiabatic coupling may be achieved by tapering a waveguide region (e.g., waveguide/optical fiber interface 318, photonically coupled region 310, etc.) such that the two halves of the photonically coupled region are introduced to one another gradually, according to some embodiments. In such embodiments, light may then jump from one tapered photonic waveguide layer to another, or between a tapered optical fiber and a tapered photonic waveguide layer, by being "squeezed" or "forced" out of the first material gradually as the first material becomes thinner closer to its respective tapered edge and into the second material as it becomes thicker farther from its respective tapered edge, following a given direction of propagation of the light. Adiabatic coupling may be further defined as modulating a size (e.g., a width, a thickness, etc.) of a given photonic waveguide layer slowly enough that a potential scattering of light is minimized while a transfer of said light between the given photonic waveguide layer and another photonic waveguide layer is occurring.

A person having ordinary skill in the art should understand that "self-alignment" in such a fabrication process as embodiments shown in FIGS. 1A-1H demonstrates how a photonically coupled region of a 3D photonic structure may be fabricated such that photonic waveguide layer 112 and photonic waveguide layer 126 are vertically superimposed, allowing for efficient transport of light between photonic waveguide layer 112 and photonic waveguide layer 126.

Figure 2:
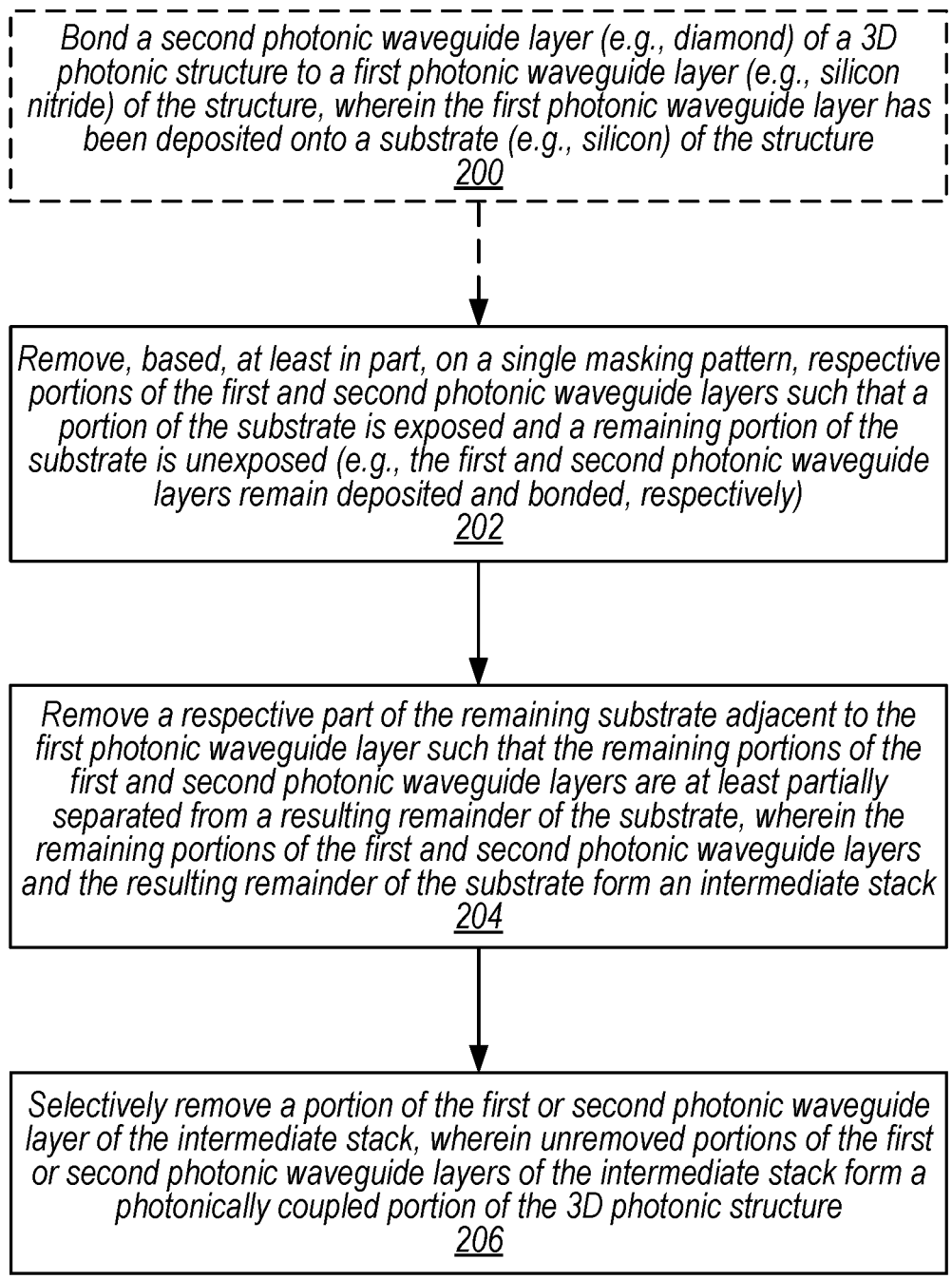
FIG. 2 is a flowchart illustrating a process of forming a photonically coupled waveguide region of a 3D photonic structure using two photonic waveguide layers and a self-aligned fabrication process, according to some embodiments.

FIG. 2 is a flowchart illustrating a process of forming a photonically coupled waveguide region of a 3D photonic structure using two photonic waveguide layers and a self-aligned fabrication process, according to some embodiments.

In some embodiments, techniques and methods for forming 3D photonic structures, such as those described herein, may resemble embodiments such as those shown in FIG. 2. In block 200, a first photonic waveguide layer (e.g., photonic waveguide layer 104), which has been deposited onto a substrate (e.g., substrate 106), is bonded to a second photonic waveguide layer (e.g., photonic waveguide layer 102). In some embodiments, the first and second photonic waveguide layers may be bonded together via one of the bonding techniques discussed above with regard to FIG. 1A (e.g., van der Waals bonding, eutectic bonding, or adhesive bonding). Alternatively, a preprepared stack (e.g., wherein a second photonic waveguide layer has already been bonded with a first photonic waveguide layer) may be used to complete the method steps described in blocks 202-206, according to some embodiments.

In block 202, portions of the first and second photonic waveguide layers may be removed (e.g., via wet and/or dry etching) according to a mask (e.g., mask 108) that has been patterned onto a 3D photonic structure stack during a single lithographic processing step) such that a portion of the substrate is exposed and another portion of the substrate remains unexposed. For example, substrate 106 is exposed to the left and to the right of intermediate stack 110, as shown in FIG. 1C, while substrate 106 remains unexposed underneath intermediate stack 110. In block 204, a part of the unexposed portion of the substrate described in block 202 is removed such that the first and second photonic waveguide layers are locally separated from the substrate. For example, selective etch 118 undercuts part of substrate 116 such that photonic waveguide layers 112 and 114 are locally isolated from substrate 116, according to some embodiments.

In block 206, a portion of the first photonic waveguide layer or the second photonic waveguide layer is removed, such as the etching process shown in FIGS. 1F-1H herein, where a portion of photonic waveguide layer 112 remains superimposed onto photonic waveguide layer 126, enabling the transfer of light between said photonic waveguide layers that have been self-aligned with nanometer-level accuracy. In some embodiments in which the photonically coupled region is adiabatically coupled, photonic waveguide layer 126 and/or photonic waveguide layer 112 may be tapered (e.g., tapering of photonic waveguide layer 126 as shown in FIG. 1H). Furthermore, a person having ordinary skill in the art should understand that blocks 204 and 206 may occur in either order, as a sequential ordering of blocks 204 then block 206, or a sequential ordering of blocks 206 then block 204, may both result in a fabrication of a photonically coupled region, according to some embodiments.

A person having ordinary skill in the art should also understand that methods described by FIG. 2 may be repeated in order to produce multiple photonically coupled regions, and/or different combinations of photonically coupled regions (e.g., as shown in FIG. 3 with regard to waveguide/optical fiber interface 318, photonically coupled region 310, etc., and the use of optical switch network 312 to route light between optical switch network 312 and respective portions of photonic waveguide layer 302).

FIG. 3 illustrates an example implementation of a photonic wafer, formed, at least in part, by a self-aligned fabrication process, in which light may be transported between the first and second photonic waveguide layers via photonically coupled waveguide regions of the photonic wafer, according to some embodiments.

In some embodiments, 3D photonic structures, such as those fabricated via self-aligned fabrication process described herein, may be used to form a photonic wafer, such as photonic wafer 300. Photonic wafer 300 may be used to transfer light between optical fiber 316 and respective quantum memories which may be patterned into photonic waveguide layer 302, according to some embodiments. In some embodiments, a process for fabricating at least some regions of photonic wafer 300 may resemble such processes shown in FIGS. 1A-1H in which a starting stack, comprising substrate 306, photonic waveguide layer 302, and photonic waveguide layer 304, may be patterned, resulting in the components shown in FIG. 3. For example, photonically coupled region 310 may represent a region of photonic wafer 300 at which light may be transferred between photonic waveguide layer 304 and photonic waveguide layer 302. As shown in FIG. 3, the two photonic waveguide layers of photonically coupled region 310 have been tapered to allow for adiabatic coupling. A person having ordinary skill in the art should understand that photonically coupled region 310 is meant to be an example, and that evanescent coupling, etc., may also be used in photonically coupled region 310. In a second example, waveguide/optical fiber interface 318 may represent a region of photonic wafer 300 at which light may be transferred between optical fiber 316 and photonic waveguide layer 304. In some embodiments, optical fiber 316 may interface with photonic waveguide layer 304 using methods other than tapering (and adiabatic coupling), such as through evanescent coupling (as shown in waveguide/optical fiber interface 318), butt coupling, photonic wire bonding, etc.

In some embodiments, an optical switch network, such as optical switch network 312, may be patterned into a material used to fabricate photonic waveguide layer 304. Optical switch network 312 may be used to route photons between waveguide/optical fiber interface 318 and photonically coupled region 310, according to some embodiments. It may be advantageous to design photonic wafer 300 such that a single optical fiber services many individual quantum memories, as shown in FIG. 3, and addressing incoming photons using optical switch network 312 enables photonic wafer 300 to be a densely packaged device. In some embodiments, patterning optical switch network 312 into photonic waveguide layer 304 may result, at least in part, on a design choice. For example, in some embodiments in which the material for photonic waveguide layer 304 is selected for its electrooptic properties, it may be advantageous to maintain the photon in photonic waveguide layer 304 until the moment it is necessary to transfer the light into photonic waveguide layer 302 (e.g., storage in a given quantum memory patterned into photonic waveguide layer 302).

Figure 4:
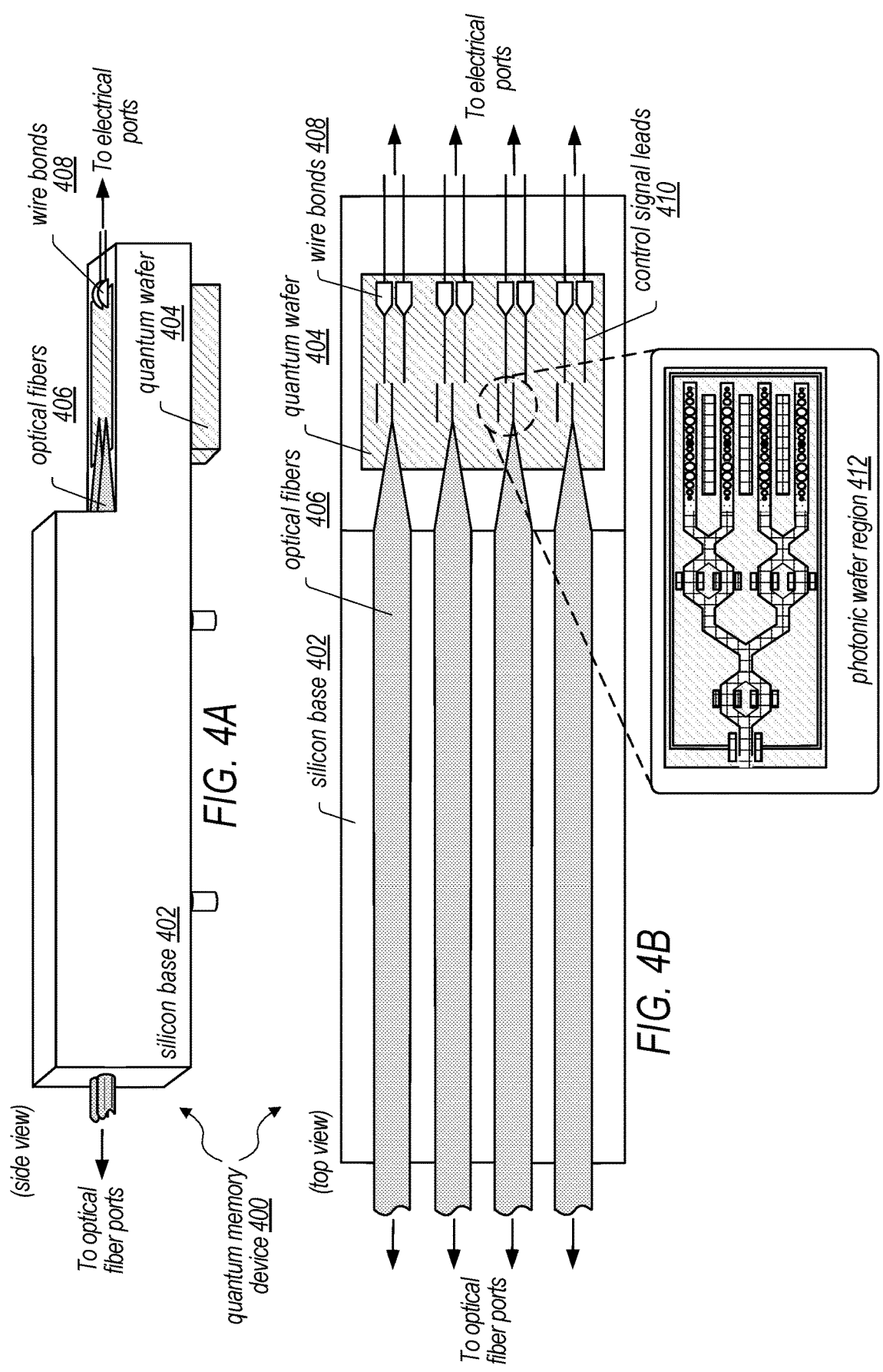
FIGS. 4A-4B illustrate an example implementation of a quantum memory device (e.g., a quantum repeater), in which a photonic wafer of the quantum memory device may be formed, at least in part, by a self-aligned fabrication process and light may be transported between an optical fiber and respective quantum memories via photonically coupled waveguide regions of the photonic wafer, according to some embodiments.

Photonic wafer 300 may be configured to receive photons in a superposition state (e.g., via optical fiber 316) to an on-wafer storage (e.g., respective quantum memories patterned into photonic waveguide layer 302 such as single quantum memory 308). In some embodiments, quantum memories patterned into photonic waveguide layer 302 may be coupled to nanophotonic cavities, such as the nanophotonic cavity shown in single quantum memory 308, which illustrates a silicon vacancy in diamond structure. In such embodiments, the silicon vacancies are embedded into nanophotonic cavities within photonic waveguide layer 302, which may be diamond in such cases. A silicon vacancy in diamond structure, such as single quantum memory 308 demonstrated in FIG. 3, may act as a quantum memory, and a corresponding nanophotonic cavity (e.g., patterned with diamond, etc.) may allow light to interface with said silicon vacancy in diamond structure. In other embodiments, however, quantum memories patterned into photonic waveguide layer 302 may resemble other structures embedded into photonic waveguide layer 302, such as nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc. Furthermore, different types of quantum memories may be embedded into respective portions of photonic waveguide layer 302, and in some embodiments as shown in FIG. 4B, different materials may be used to respective photonic wafer regions (e.g., photonic wafer region 412) of quantum wafer 404, allowing respective photonic waveguide layers to be patterned according to a given quantum memory architecture.

In some embodiments wherein photonic wafer 300 may be used within a quantum memory device, such as quantum memory device 400 (e.g., for use as a quantum network node for quantum entanglement distribution), photonic wafer 300 may be configured to store a first received entangled particle of a first pair of entangled particles in a first single quantum memory 308 of photonic waveguide layer 302 and also store a second received entangled particle of a second pair of entangled particles in a second single quantum memory 308 of photonic waveguide layer 302.

Photonic wafer 300 (or a quantum measurement device connected to photonic wafer 300 either inside or outside of quantum memory device 400) may further be configured to perform one or more joint measurements on the first and second particles without collapsing superposition states of the first and second entangled particles. The joint measurements may determine a correlation relationship between the superposition states of the entangled particles such that entanglement can be extended between the pairs of entangle particles.

In some embodiments, quantum memories within photonic waveguide layer 302 may be heralded, meaning that when a particle arrives and is stored in a single quantum memory such as single quantum memory 308, a quantum measurement device issues a heralding signal announcing the arrival of the particle. In some embodiments, such a heralding signal may be issued via optical fiber 316, and may be used to trigger operation of an optical switch within optical switch network 312 in order to align the next pathway within optical switch network 312 for routing the next incoming particle to a respective quantum memory of photonic waveguide layer 302.

In some embodiments, photonic wafer 300 may further include a conversion interface (e.g., nonlinear optics elements 314). For example, in some embodiments, a conversion interface (e.g., nonlinear optics elements 314) may convert a transmission frequency of a received photonic particle to a different frequency prior to storage of the particle in a given quantum memory within photonic waveguide layer 302. For example, in some embodiments, fiber optical links (e.g., optical fiber 316) may transmit photonic particles using different frequencies and such variations may be adjusted via a conversion interface of photonic wafer 300. As another example, particles received at photonic wafer 300 via optical ground stations and/or particles received at photonic wafer 300 via fiber links may be transmitted at different wavelengths and a conversion interface of photonic wafer 300 may convert the wavelength of the received particles to a wavelength used by a given single quantum memory, such as single quantum memory 308, to store quantum particles in said memory. A person having ordinary skill in the art should understand that nonlinear optics elements 314, as shown in FIG. 3, may also provide phase shifting, amplitude modulation, and/or other functionalities with respect a received particle, and/or any other interfacing property that may be required in terms of manipulating an incoming particle before routing the particle to storage on photonic wafer 300. Furthermore, as shown in FIG. 3, nonlinear optics elements 314 may also be fabricated using a same material as the material used to fabricate photonic waveguide layer 304, according to some embodiments.

FIGS. 4A-4B illustrate an example implementation of a quantum memory device (e.g., a quantum repeater), in which a photonic wafer of the quantum memory device may be formed, at least in part, by a self-aligned fabrication process and light may be transported between an optical fiber and respective quantum memories via photonically coupled waveguide regions of the photonic wafer, according to some embodiments.

FIGS. 4A-4B illustrate different perspective views of such a quantum memory device in which 3D photonic structures (e.g., 3D photonic structures illustrated in photonic wafer 300) may be fabricated using self-aligned fabrication process described herein and incorporated into a quantum wafer (e.g., quantum wafer 404) for photon reception and storage. In some embodiments, quantum memories may provide a method of receiving, storing, and providing quantum information. In some cases, quantum memories may be deployed for use in large-scale optical fiber networks and/or quantum entanglement networks, for example as quantum repeaters, that store and effectively connect distributed entangled particles to provide secure, long-distance communications. In such applications, quantum memory device 400 may function to control the tuning (e.g., adjustments to the local electrical, optical, thermal, electromechanical environment) of quantum memories housed within quantum memory device 400.

In some embodiments, a quantum memory device, such as quantum memory device 400, may comprise quantum memories and quantum memory control devices. Note that for ease of illustration, some embodiments of the following description are given in terms of quantum memory device 400 resembling a quantum repeater. However, in some embodiments, a quantum memory device, as described herein in FIGS. 4A-4B, may be used for other purposes, such as storing quantum information locally at a given location. For example, in some situations, quantum memory device 400 may be used to store quantum information (such as in a cache) that is used by multiple locally situated quantum computers. As seen in FIGS. 4A-4B, quantum wafer 404 may house quantum memories via photonic wafer regions such as photonic wafer region 412. Fabrication of photonic wafer region 412 may be completed using self-aligned fabrication processes described herein, and photonic wafer region 412 may resemble photonic wafer 300 and the functionalities for photonic wafer 300 (e.g., routing light between an optical fiber and respective quantum memories of photonic wafer 300) described herein.

Quantum memory control devices of quantum memory device 400 may, for example, provide mechanisms for receiving and routing quantum information (e.g., entangled particles) to be stored in the quantum memories of quantum wafer 404. In another example, quantum memory control devices may provide mechanisms for receiving, sending, emitting, and/or controlling optical and/or electrical control signals to, or from, quantum wafer 404. In yet another example, quantum memory control devices may modify the behavior of the quantum memories on quantum wafer 404 via the use of low-frequency control signals (e.g., microwave, RF, and/or DC control signals) that may induce strain on the quantum memories. Quantum memory control devices may additionally control heat and/or gas flow onto quantum wafer 404. Quantum memory control devices may also be used to deliver electrical control signals that result in the creation of local electromechanical strain fields near the quantum memories of quantum wafer 404, according to some embodiments. Such electromechanical strain fields may, for example, enable for the tuning of optical and/or spin properties of quantum memories on quantum wafer 404 for improved performance and operation of said quantum memories. This may be referred to as strain tuning of the quantum memories, according to some embodiments.

The placements and interactions of the quantum memories and some quantum memory control devices within quantum memory device 400 may resemble embodiments shown in the side and top view of quantum memory device 400 in FIGS. 4A and 4B, respectively. In some embodiments, quantum memory device 400 may additionally include optical fiber ports and/or electrical ports that provide access points between optical fiber cables, control signal leads, electrical wires, electrical cables, etc., located external to quantum memory device 400, and quantum wafer 404.

In some embodiments, quantum memory device 400 may include a base material, such as silicon base 402, onto which quantum wafer 404 may be bonded/attached. In some embodiments, as shown in FIGS. 4A-4B, the base material is silicon. However, it should be understood by a person having ordinary skill in the art that the base material could be another material that provides similar functionalities as silicon base 402 (e.g., another semiconducting material). In some embodiments, optical fibers, such as optical fibers 406, may be inserted into grooves or through-holes embedded inside silicon base 402. As shown in FIG. 4B, optical fibers 406 may be coupled to quantum wafer 404 and to optical fiber ports of quantum memory device 400. Silicon base 402 may house several rows of optical fibers, according to the depth of silicon base 402, that are fit into grooves. Silicon base 402 may also be bonded (e.g., soldered) to quantum wafer 404 (e.g., via indium bumps). In some embodiments, optical fibers 406 may be referred to as "tapered" optical fibers due to their needle-point shape, as shown in FIG. 4B. Such tapered optical fibers may result from the completion of a self-aligned fabrication process, such as those described herein, in which non-trivial geometric shapes may be obtained through etching parameters.

In some embodiments, wire bonds, such as wire bonds 408 (e.g., soldering points), may be used to connect control signal leads 410 to electrical ports of quantum memory device 400. Electrical connections to quantum wafer 404 may also be fabricated using a "flip chip" method, according to some embodiments. In such embodiments, a "flip chip" layer may enable routing of electrical signals with complex topologies to quantum wafer 404. In some embodiments, electrical control signals, such as microwave or RF frequency control signals, may be used to control the state (e.g., state change) of a given quantum memory. In some embodiments in which the quantum memories on quantum wafer 404 are nanophotonic cavities (e.g., single quantum memory 308), DC or low-frequency AC electric fields may be used to tune the color center resonances of such nanophotonic cavities. In some embodiments, such electrical control signals may also be configured such that cross talk and excess heating of the quantum memories on quantum wafer 404 may be avoided. In some embodiments, electrical control signals, such as DC, RF, and/or microwave signals, may be delivered to the quantum memories of quantum wafer 404 via micro-patterned electrical lines (e.g., coplanar waveguides, capacitors, etc. that may be made of semiconducting and/or superconducting materials) on both silicon base 402 and quantum wafer 404 (e.g., control signal leads 410). For example, such micro-patterned electrical lines may be patterned using photonic waveguide layer 304.

In some embodiments, quantum wafer 404 may also include other types of devices on the same wafer such that quantum wafer is a densely packaged device. For example, photon detectors, frequency conversion nonlinear optics (e.g., nonlinear optics elements 314), and/or light sources on chip may be fabricated. In some embodiments, electromagnets may be provided on quantum wafer 404 (e.g., small, "on-chip" electromagnets) in order to finetune a local magnetic field environment of the quantum memories. Such "on-chip" electromagnets may be patterned onto quantum wafer 404 via photolithography and/or electron beam lithography fabrication processes.

In some embodiments, quantum memories on quantum wafer 404 may resemble single quantum memory 308 and functionalities and/or the various types of quantum memory described above with regard to single quantum memory 308. Quantum wafer 404 may comprise a "host material" for quantum memories (photonic waveguide layer 302), and may be micro-patterned for electrical lines that allow electrical control signals to reach the quantum memories, according to some embodiments. The materials chosen for quantum wafer 404 may vary based on the type of quantum memory it hosts. For example, quantum wafer 404 may resemble a nanophotonic crystal interface for a type of quantum memory such as a diamond SiV color center. However, quantum wafer 404 may resemble any nanophotonic cavity (e.g., nanophotonic crystal cavities, ring resonators, plasmonic cavities, etc.) or Fabry Perot cavity that provides an optical interface for quantum memories of quantum memory device 400, when used to house other types of quantum memories. The nanophotonic cavities may be attached to a variety of substrates, such as diamond, LiNbO, or silicon, as described herein.

Once the type of nanophotonic cavity is chosen, quantum memory control devices of interface layer 406 may be used to match the frequency of the nanophotonic cavity to the given quantum emitter (e.g., an entangled particle source). For example, the quantum memory control devices may be used to perform optical tuning (e.g., refractive index shift), electromechanical deformation tuning, and/or gas (e.g., $N_2$ gas) deposition tuning onto the nanophotonic cavities. In addition, control signal leads 410 may provide electrical control signals to, and/or from, the quantum memories and may be attached to quantum wafer 404 via wire bonds 408. In some embodiments, control signal leads 410 may be routed to respective nonlinear optics elements 314 via electrical routing paths such as electrical routing path 320 (e.g., electrical connections that have been patterned onto photonic wafer 300, such as gold pads).

Figure 5:
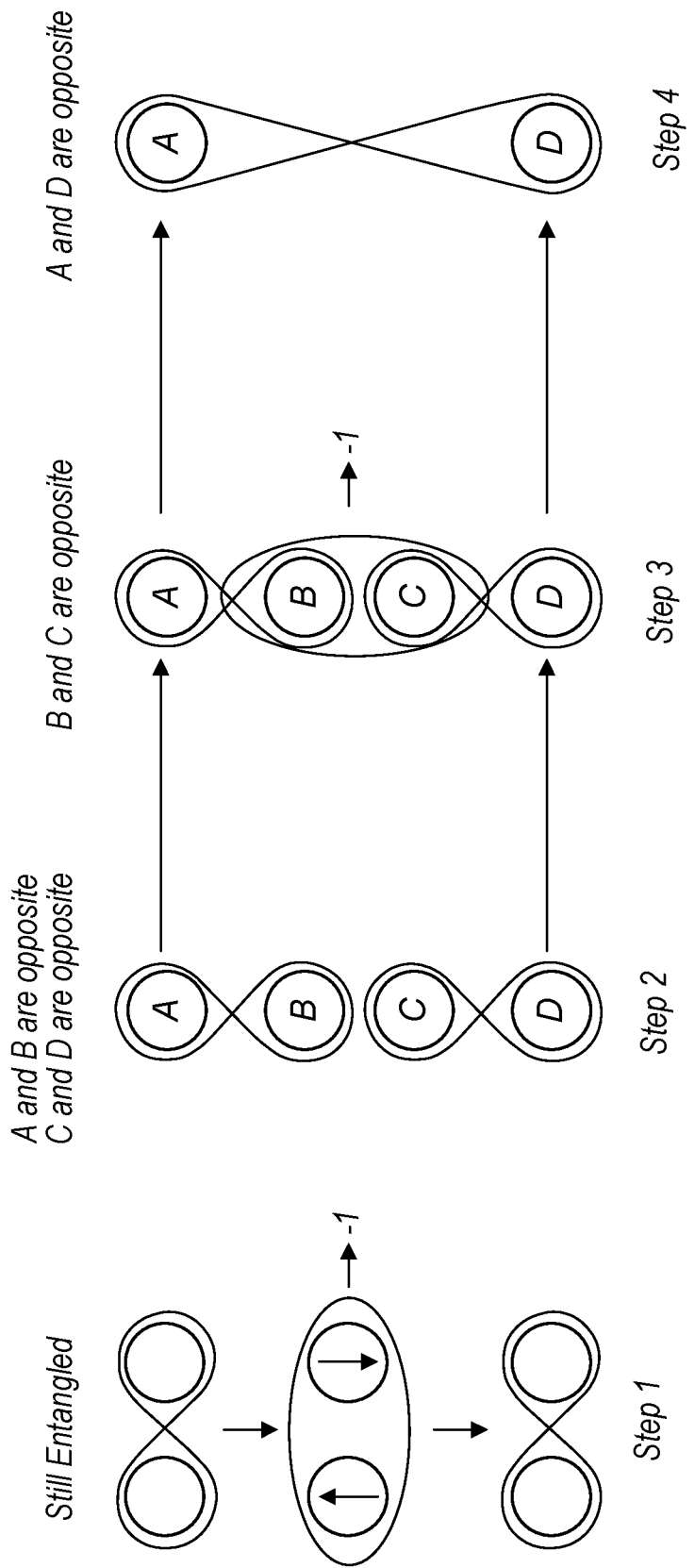
FIG. 5 is an example diagram illustrating how entanglement is extended by performing joint measurements of received particles of respective sets of entangled particles distributed via fiber optic network links to/from quantum memory devices, such as quantum repeaters, according to some embodiments.

FIG. 5 is an example diagram illustrating how entanglement is extended by performing joint measurements of received particles of respective sets of entangled particles distributed via fiber optic network links to/from quantum memory devices, such as quantum repeaters, according to some embodiments.

In some embodiments, joint measurements as shown in FIG. 5 may be performed for photons stored in quantum memories (e.g., single quantum memory 308) in a quantum memory device, such as packaged quantum memory device 400. For example, at step 1, a joint measurement is performed that measures two particles (e.g., photons) in such a way as that the joint measurement only determines if the two particles are the same or opposite (e.g., in the same quantum state or not). This is done without revealing information about the individual particles. Then, at step 2, the entangled pairs are defined by their correlations, e.g., opposite or the same. In the example shown in FIG. 5 both A/B and C/D are entangled such that they are opposites. Next, at step 3 a joint measurement is performed on B/C with an outcome (e.g., opposite or same), which is opposite in the example case shown in FIG. 5. This tells A that its compliment is the opposite D's compliment, allowing A and D to infer they are opposites. Then, using this information at step 4 A/D the particles are now entangled such that they are always in the opposite state. In some embodiments, the joint measurements may be performed using a local two-qubit gate between B and C (e.g., a CNOT gate) and may further include measuring each bit individually. This can be understood as an entangling operation and a measurement, or conversely as a single measurement in an "entangled basis." When the joint measurements are performed in this way, the results reveal information about the correlations between particles, such as particles B and C, but not information about the particles themselves. This is due to the entanglement generated by the two-qubit operation. Such joint measurements may be performed at a quantum measurement device, according to some embodiments.

Illustrative Computer System

Figure 6:
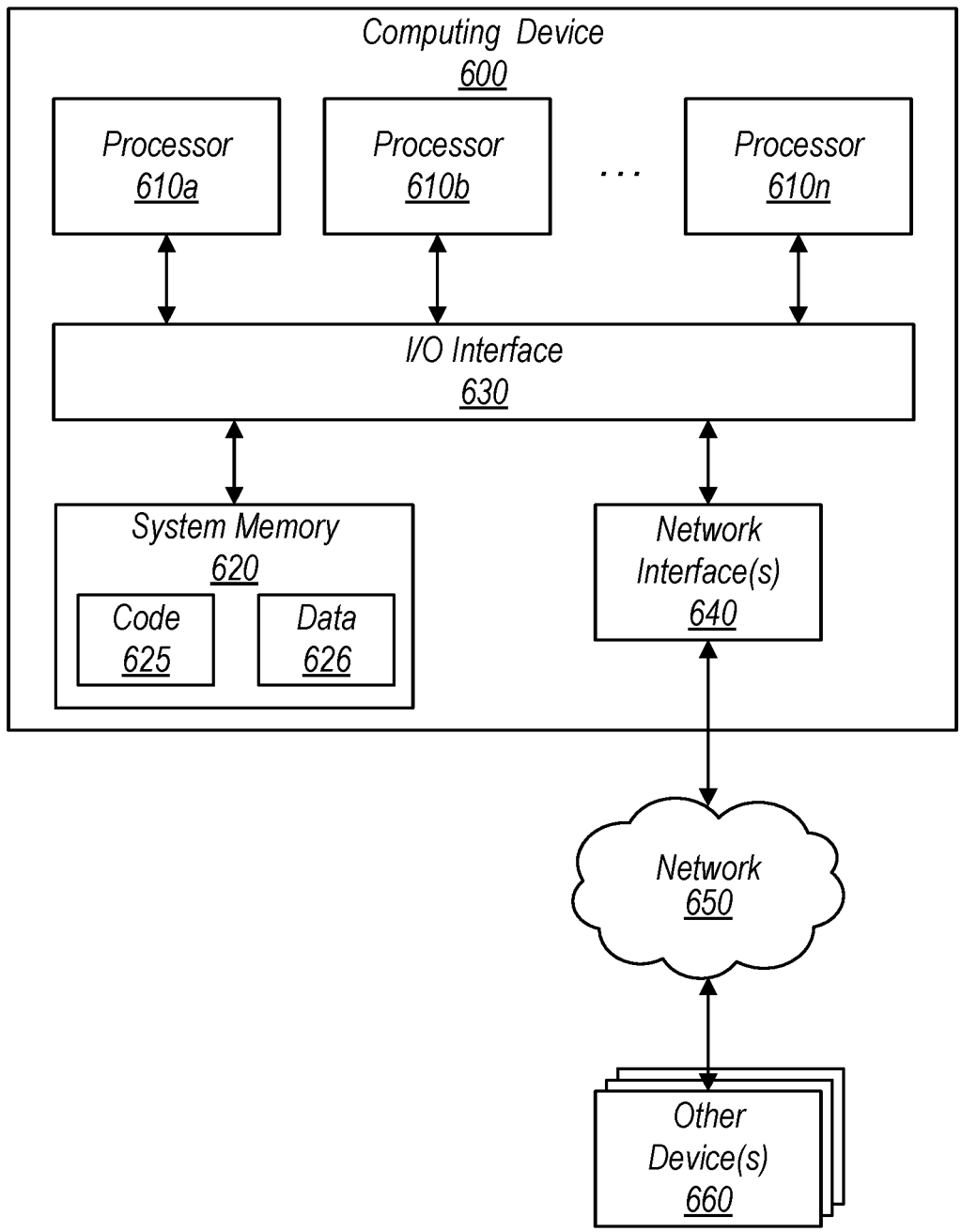
FIG. 6 is a block diagram illustrating an example computing device that may be used in at least some embodiments.

FIG. 6 is a block diagram illustrating an example computing device that may be used in at least some embodiments.

FIG. 6 illustrates such a general-purpose computing device 600 as may be used in any of the embodiments described herein. In the illustrated embodiment, computing device 600 includes one or more processors 610 coupled to a system memory 620 (which may comprise both non-volatile and volatile memory modules) via an input/output (I/O) interface 630. Computing device 600 further includes a network interface 640 coupled to I/O interface 630.

In various embodiments, computing device 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. In some implementations, graphics processing units (GPUs) may be used instead of, or in addition to, conventional processors.

System memory 620 may be configured to store instructions and data accessible by processor(s) 610. In at least some embodiments, the system memory 620 may comprise both volatile and non-volatile portions; in other embodiments, only volatile memory may be used. In various embodiments, the volatile portion of system memory 620 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 620 as code 625 and data 626.

In some embodiments, I/O interface 630 may be configured to coordinate I/O traffic between processor 610, system memory 620, and any peripheral devices in the device, including network interface 640 or other peripheral interfaces such as various types of persistent and/or volatile storage devices. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other devices 660 attached to a network or networks 650, such as other computer systems or devices as illustrated in FIG. 1A through FIG. 5, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may represent one embodiment of a computer-accessible medium configured to store at least a subset of program instructions and data used for implementing the methods and apparatus discussed in the context of FIG. 1A through FIG. 5. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 600 via I/O interface 630. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 600 as system memory 620 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A quantum memory device, comprising:
an optical fiber port;
a plurality of quantum memories;
a 3D photonic structure configured to transport light between an optical fiber connected to the optical fiber port and respective ones of the plurality of quantum memories, wherein the 3D photonic structure comprises:
a substrate; and
a photonically coupled waveguide region, comprising:
a first photonic waveguide layer, deposited onto the substrate, configured to interface with the optical fiber; and
a second photonic waveguide layer, bonded to the first photonic waveguide layer, configured to interface with the respective ones of the plurality of quantum memories, wherein the first photonic waveguide layer and the second photonic waveguide layer have been photonically coupled via a self-aligned fabrication process.

2. The quantum memory device of claim 1, wherein the photonically coupled waveguide region, formed via the self-aligned fabrication process, is formed by:
removing, based, at least in part, on a single masking pattern, respective portions of the first photonic waveguide layer and the second photonic waveguide layer such that a portion of the substrate is exposed and a remaining portion of the substrate is unexposed, wherein a remaining portion of the first photonic waveguide layer remains deposited on the remaining portion of the substrate and a remaining portion of the second photonic waveguide layer remains deposited on the remaining portion of the first photonic waveguide layer;
removing a respective part of the remaining substrate adjacent to the first photonic waveguide layer such that the remaining portions of the first and second photonic waveguide layers are at least partially separated from a resulting remainder of the substrate, wherein the remaining portions of the first and second photonic waveguide layers and the resulting remainder of the substrate form an intermediate stack; and
selectively removing a portion of the first photonic waveguide layer or a portion of the second photonic waveguide layer of the intermediate stack, wherein unremoved portions of the first photonic waveguide layer or the second photonic waveguide layer of the intermediate stack form the photonically coupled waveguide region of the 3D photonic structure.

3. The quantum memory device of claim 1, wherein:
the first photonic waveguide layer comprises a spacer layer; and
the 3D photonic structure is configured to transport the light via evanescent coupling.

4. The quantum memory device of claim 1, further comprising a network of optical switches, patterned into the first photonic waveguide layer, configured to provide routes between the optical fiber and the photonically coupled waveguide region.

5. The quantum memory device of claim 1, further comprising metal contacts, patterned into the first photonic waveguide layer, configured to route electrical control signals to respective ones of the plurality of quantum memories.

6. The quantum memory device of claim 1, wherein the plurality of quantum memories have been patterned into the second photonic waveguide layer.

7. The quantum memory device of claim 1, further comprising at least one of:
one or more photonic detectors;
one or more electrooptic modulators; or
one or more light sources.

8. The quantum memory device of claim 1, wherein the first photonic waveguide layer and the second photonic waveguide layer are bonded to one another prior to forming the photonically coupled waveguide region.

9. The quantum memory device of claim 1, wherein said bonding comprises one of the following techniques:
van der Waals bonding;
eutectic bonding; or
adhesive bonding.

10. The quantum memory device of claim 1, wherein the first photonic waveguide layer comprises at least one of the following materials:
silicon nitride;
lithium niobate; or
aluminum nitride.

11. The quantum memory device of claim 1, wherein the first photonic waveguide layer comprises at least one of the following materials:
diamond;
silicon;
silicon carbide;
lithium niobate; or
aluminum nitride.

12. A 3D photonic structure, comprising:
a substrate; and
a photonically coupled waveguide region, comprising:
a first photonic waveguide layer deposited onto the substrate; and
a second photonic waveguide layer bonded to the first photonic waveguide layer,
wherein:

the 3D photonic structure is configured to transport light between the first photonic waveguide layer and the second photonic waveguide layer via the photonically coupled waveguide region; and the first photonic waveguide layer and the second photonic waveguide layer have been photonically coupled via a self-aligned fabrication process.

13. The 3D photonic structure of claim 12, wherein:

the first photonic waveguide layer comprises a spacer layer; and the spacer layer comprises at least one of:
- a metal material layer;
- a polymer material layer; or
- a dielectric material layer.

14. The 3D photonic structure of claim 12, wherein in the self-aligned fabrication process, the first photonic waveguide layer and the second photonic waveguide layer are bonded to one another prior to forming the photonically coupled waveguide region.

15. The 3D photonic structure of claim 14, wherein the bond is formed using one of the following techniques:
- van der Waals bonding;
- eutectic bonding; or
- adhesive bonding.

16. The 3D photonic structure of claim 12, wherein the photonically coupled waveguide region, formed via the self-aligned fabrication process, is formed by:

removing, based, at least in part, on a single masking pattern, respective portions of the first photonic waveguide layer and the second photonic waveguide layer such that a portion of the substrate is exposed and a remaining portion of the substrate is unexposed, wherein a remaining portion of the first photonic waveguide layer remains deposited on the remaining portion of the substrate and a remaining portion of the second photonic waveguide layer remains deposited on the remaining portion of the first photonic waveguide layer;

removing a respective part of the remaining substrate adjacent to the first photonic waveguide layer such that the remaining portions of the first and second photonic waveguide layers are at least partially separated from a resulting remainder of the substrate, wherein the remaining portions of the first and second photonic waveguide layers and the resulting remainder of the substrate form an intermediate stack; and selectively removing a portion of the first photonic waveguide layer or a portion of the second photonic waveguide layer of the intermediate stack, wherein unremoved portions of the first photonic waveguide layer or the second photonic waveguide layer of the intermediate stack form the photonically coupled waveguide region of the 3D photonic structure.

17. The 3D photonic structure of claim 16, wherein:

at least one of the unremoved portions of the first photonic waveguide layer or the second photonic waveguide layer of the photonically coupled waveguide region is tapered; and the 3D photonic structure is configured to transport the light via adiabatic coupling between the first photonic waveguide layer and the second photonic waveguide layer.

18. The 3D photonic structure of claim 12, wherein the 3D photonic structure is configured to transport the light via evanescent coupling.

19. The 3D photonic structure of claim 12, wherein the first photonic waveguide layer comprises at least one of the following materials:
- silicon nitride;
- lithium niobate; or
- aluminum nitride.

20. The 3D photonic structure of claim 12, wherein the second photonic waveguide layer comprises at least one of the following materials:
- diamond;
- silicon;
- silicon carbide;
- lithium niobate; or
- aluminum nitride.

* * * * *